April 25, 1961  U. FRITZE ET AL  2,981,360

SOUND-ABSORBING SYSTEMS

Filed Feb. 17, 1955

INVENTORS:
ULRICH FRITZE, RUDOLF MÜLLER, HANS-WILLI PAFFRATH.
BY
ATTORNEY

United States Patent Office 2,981,360
Patented Apr. 25, 1961

2,981,360
SOUND-ABSORBING SYSTEMS
Ulrich Fritze, Koln-Stammheim, Rudolf Müller, Leverkusen, and Hans-Willi Paffrath, Koln-Deutz, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware Filed Feb. 17, 1955, Ser. No. 488,962
Claims priority, application Germany Feb. 18, 1954
2 Claims. (Cl. 181—33)

This invention relates to sound-absorbing systems and sound-absorbing structures therefor.

An object of the invention is to provide an improved sound-absorbing system involving the use of plasitc foams.

Another object of the invention is to provide a novel sound-absorbing system which is far more effective than known systems based on the same layer thickness.

Another object of the invention is to provide a novel sound-absorbing unit comprising a plurality of plastic foam mats of different porosities and/or elasticities.

An additional object of the invention is to provide a novel composite plastic foam sound-absorbing unit which may be mounted directly upon walls of conventional construction without any preliminary treatment.

A further object of the invention is to provide a novel composite plastic foam sound-absorbing unit which is sufficiently flexible to adapt itself to any required curvature in the wall or other surface to which it is applied.

A still further object of the invention is to provide a novel composite plastic foam sound-absorbing unit which may be readily transported without breakage.

Other objects and advantages will become apparent to those skilled in the art as the description of the invention proceeds.

Figure 1:
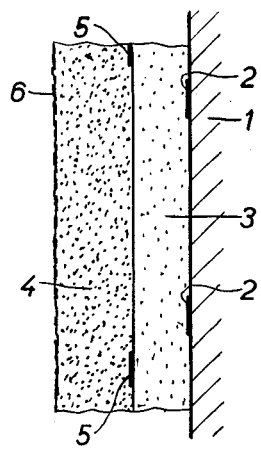
Figure 1 is an edge view of a composite mat attached to a wall.

Sound-absorbing structures having effective sound-absorbing properties over a wide frequency range, i.e. including frequencies lower than 500 cycles per second, usually consist of apertured resin bonded wood fibre plates secured on wooden strips or bars at a predetermined distance from a wall and sound-absorbing fibrous materials of relatively high flow resistance, which are arranged between the apertured plates and the wall. The mounting of such structures is expensive and complicated, since first of all spacing bars have to be erected in front of the wall and subsequently selected apertured plates of different perforation have to be mounted on these spacing bars.

Structures which do not use apertured plates, but simply fibrous materials or cellular materials, such as glass-wool, cocos fibres and foamed rubber, do not have a satisfactory sound absorption effect when mounted directly on the wall, especially in the frequency range below 500 cycles per second. The degree of sound absorption of such structures is improved by reverting to the use of spacing bars, which is more complicated from the point of view of assembly, and securing the fibrous or cellular substances in spaced relation to the wall on previously fitted wooden bars.

It has now been found that by using a plurality of mats made by bonding together plastic foams of different porosities and/or elasticities and by directly applying these composite mats, for example by adhesives, to the bare walls, it is possible to obtain a sound-absorbing system which is far more effective than known systems based on the same layer thickness.

In one specific embodiment of the invention, two plastic foam mats are bonded together, the first mat, which is to rest on the wall surface, having pores about 2 to about 10 mm. in diameter and the second mat, which is to face the air space, having pores about 0.1 to about 1.5 mm. in diameter. Alternatively, three or more plates having different porosities may be bonded together, the mat with the largest pores being attached to the wall surface and the mat with the finest pores being remote from the wall.

If plastic foam mats of different elasticity are used, the mat with fine pores will preferably have an impact elasticity of about 20 to 25% and the mat with large pores will preferably have an impact elasticity of about 15 to 20%, as determined by the method of Schoob.

The efficiency of these composite mats of foamed materials is further substantially improved by a treatment of the surface which faces the air space. For example, it has been found that the degree of sound absorption is greatly increased if the surface is sprayed with a lacquer which may also contain color pigments.

Among the lacquers with which the surface of the fine-pored mat facing the air space may be treated are all conventional lacquers, such as linseed oil-based lacquers and lacquers based on natural or artificial resins.

The foamed products may be built up in known manner from synthetic resins, such as, for example, polyurethanes, polyvinyl chloride or urea-formaldehyde polycondensates.

The use of composite mats of foamed products also provides other advantages over known methods of construction, as well as the advantage of simple assembly, since these composite mats are supplied in a condition ready for mounting by adhesives and can be applied immediately, without any preliminary work, to walls of conventional construction. Another advantage of the composite mats is that they can be adapted to any required curvatures. In addition, it is not necessary to take any special precautions when transporting the composite mats of foamed products since they are elastic and consequently unbreakable.

The following example further illustrates the invention.

*Example*

A mat consisting of a polyester-polyisocyanate foam having pores about 0.3–1.5 mm. in diameter and having a thickness of 20 mm. is bonded by spots of adhesive to a second mat of a similar foam having pores with a diameter of 2–10 mm. and having a thickness of 10 mm. The spots of adhesive are at a distance of about 10 cm. from one another. The composite mat is bonded by means of an adhesive to an unprepared wall surface in such a manner that the part with the large pores rests on the wall surface. As the adhesive, there is used a 25% ethyl acetate solution of an isocyanate-modified polyester prepared from 9 parts of an adipic acid-ethylene glycol-trimethylol propane polyester and 1 part of tolylene diisocyanate. The surface of the fine-pored mat facing the air space is printed with "acramine" ink prepared in accordance with Example 1 of German Patent 908,133.

This embodiment of the invention will be more clearly understood by referring to Figure 1, in which 1 is the wall (for example concrete), 2 are spots of adhesive, 3 is the mat with large pores, 4 is the mat with fine pores, 5 are the spots of adhesive between the two mats and 6 is the layer of lacquer which is applied to the outside of the mat 4.

Figure 2:
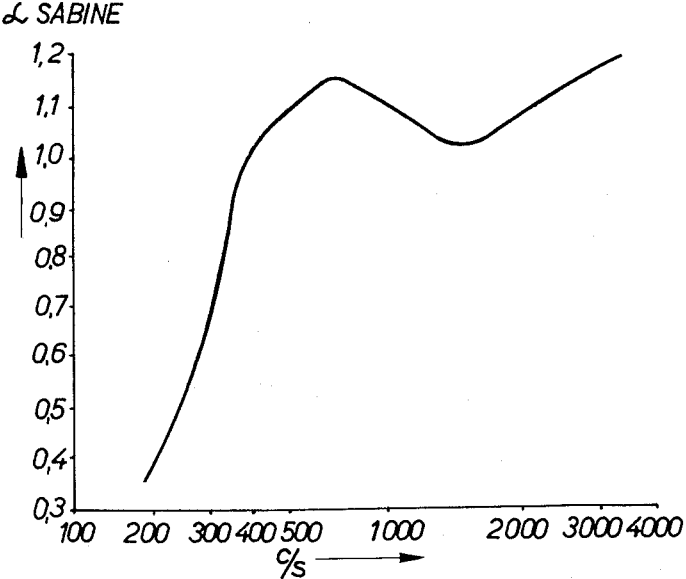
Figure 2 is a line graph showing the frequency response of the mat shown in Figure 1.

Figure 2 shows the frequency response of such a sound-absorbing arrangement.

The polyester-polyisocyanate foam is prepared from the following components:

(1) 100 parts by weight of a polyester, with OH number 50, produced from adipic acid, diethylene glycol and a small amount of trimethylol propane.

(2) 10 parts by weight of an activator mixture consisting of 3 parts by weight of the esterification product of 2 mols of N-diethyl ethanolamine and 1 mol of adipic acid of the formula

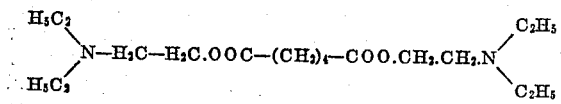

1 part by weight of an emulsifier from 1 mol of oleic acid and ½ mol of diethylamine of the formula

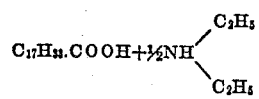

3 parts by weight of sulphonated castor oil and 2 parts by weight of water, (3) 48 parts by weight of toluylene diisocyanate.

The polyester, the activator mixture and the diisocyanate are introduced separately and in measured quantities into a mixing vessel in which they are intimately mixed with one another by being injected through a nozzle and stirred. The mixture is discharged into a suitable mold and converted into a foam by the carbon dioxide split off during the reaction leading to the formation of polyurethane.

It is also possible, for example, to use the following foam instead of the polyester-polyisocyanate foam described above:

50 parts by weight of a polyvinyl chloride paste are formed into a dough with equal parts of a suitable plasticizer (for example, the reaction product of a paraffin sulphochloride mixture having 12–18 carbon atoms with a phenolcresol mixture). After addition of 10 to 12% of benzenesulphonic acid hydrazide, the mixture is homogeneously mixed on a roll. The mixture is introduced into a tightly closing pressure mold and heated for 10–15 minutes at a pressure of 200 kg./cm.$^2$ and at a temperature of 160° C. The resulting plastic foam is thereafter soaked for 5–10 minutes in a water bath at 100° C.

Although the foregoing description has been restricted to the use of mats of plastic foam which are united together in the form of composite units by means of spot bonding, the invention is not restricted thereto as the bonding may be effected by means of adhesives applied uniformly to a surface of one or more of the above mats. Moreover, such composite units may be produced by various mechanical bonding means or by superimposing two or more foaming compositions which yield plastic foams having different physical properties.

Where reference is made in the claims to plastic foam mats of different physical properties, it is to be understood that this signifies plastic foam mats having different porosities, different elasticities or a combination of these properties.

What is claimed is:

1. A sound-proofing system comprising in combination with a wall a sound absorbing structure comprising a plurality of elastic polyurethane foam mats of different porosity bonded together in the form of a composite unit, the mat with the largest pores being attached to the wall surface and the mat with the finest pores facing the air space.

2. A sound-proofing system as defined in claim 1 wherein the surface of said composite unit which faces the air space is provided with a coating.

References Cited in the file of this patent

UNITED STATES PATENTS

| | | |
|---|---|---|
| 2,081,952 | Parkinson | June 1, 1937 |
| 2,268,160 | Miles | Dec. 30, 1941 |
| 2,694,233 | Page | Nov. 16, 1954 |

FOREIGN PATENTS

| | | |
|---|---|---|
| 412,923 | Great Britain | July 3, 1934 |
| 482,809 | Great Britain | Apr. 5, 1938 |
| 510,707 | Great Britain | Aug. 4, 1939 |
| 589,490 | Great Britain | June 23, 1947 |
| 17,922 | Union of South Africa | Oct. 26, 1953 |

(Based on German Application No. F10274 XII/39a, filed Oct. 29, 1952)

OTHER REFERENCES

Publication, "Modern Plastics," November 1954, pages 106–108 and 214 to 216.